United States Patent [19]

Shimano et al.

[11] 4,044,381

[45] Aug. 23, 1977

[54] AUTOMATIC WAVEFORM EQUALIZING SYSTEM FOR TELEVISION RECEIVER

[75] Inventors: Masaru Shimano; Iwao Aizawa, both of Yokohama, Japan

[73] Assignee: Hitachi, Ltd., Japan

[21] Appl. No.: 582,076

[22] Filed: May 30, 1975

[30] Foreign Application Priority Data

| June 3, 1974 | Japan | 49-62680 |
| June 3, 1974 | Japan | 49-62681 |
| June 3, 1974 | Japan | 49-62682 |
| June 3, 1974 | Japan | 49-62684 |

[51] Int. Cl.² .................... H04N 5/14; H04N 5/44
[52] U.S. Cl. ................................. 358/160; 358/188
[58] Field of Search ............... 178/DIG. 12, DIG. 4, 178/7.3 R; 358/10, 36, 160, 188; 333/70 T; 325/65

[56] References Cited

U.S. PATENT DOCUMENTS

| 3,283,063 | 11/1966 | Kawashima et al. | 325/65 X |
| 3,646,480 | 2/1972 | Spaulding | 333/70 T X |
| 3,730,984 | 5/1973 | Smith | 358/10 X |
| 3,778,543 | 12/1973 | Lowry | 328/55 X |
| 3,858,240 | 12/1974 | Golding et al. | 333/70 T X |

Primary Examiner—John C. Martin
Assistant Examiner—Aristotelis M. Psitos
Attorney, Agent, or Firm—Craig & Antonelli

[57] ABSTRACT

A television signal transmitted to and received by a television receiver is subject to waveform distortion while it is transmitted through the transmission path including the internal circuits of the television receiver. Such waveform distortion is automatically eliminated by an equalizer whose operating characteristic is controlled by a signal obtained by comparing the waveform of a signal to be transmitted with a constant waveform in the received television signal with the waveform of a reference signal generated by a reference signal generator. A transversal filter is used as this equalizer.

4 Claims, 9 Drawing Figures

AUTOMATIC WAVEFORM EQUALIZING SYSTEM FOR TELEVISION RECEIVER

BACKGROUND OF THE INVENTION

1. Field of the Invention

This invention relates to a technique of automatically compensating for waveform distortion of a televison signal, and more particularly to a system for automatically compensating for waveform distortion of a television signal occurring in the television signal transmission path including the internal circuits of a television receiver.

2. Description of the Prior Art

Typical waveform distortion of a television signal includes overshoot, smearing, ringing and ghost appearing at rising and falling portions of the waveform, and such waveform distortion is undesirable in that the quality of reproduced pictures is extremely deteriorated when the waveform distortion is excessive. The sources of such undesirable waveform distortion include multiplex propagation of the waves due to reflection by buildings and mountains, impedance mismatching between the receiving antenna and the feeder (or cable), impedance mismatching between the feeder (or calbe) and the television receiver, and deviation of the frequency characteristic of the filter in the intermediate frequency amplifier circuit or the like in the television receiver from the most suitable operating condition.

Generally, the waveform distortion due to these sources is not non-linear distortion but so-called linear distortion caused merely by the deviation of the frequency characteristic of the filter from the desired one. Therefore, the waveform distortion of the kind above described can be compensated as a matter of principle by inserting in the television signal transmission path a filter having a frequency characteristic which is exactly opposite to the frequency characteristic giving rise to the undesirable waveform distortion.

A transversal filter can be used for compensation for such waveform distortion and is now practically employed as a waveform equalizer. Such a waveform equalizer suitable for the equalizing purpose for a video signal can be composed by a delay circuit having a plurality of taps each giving a delay time of a $\tau$ seconds, a plurality of adjusting circuits capable of adjusting the polarity and amplitude of the outputs of the individual taps independently of each other, and an adder circuit for adding the outputs of these adjusting circuits.

The principle of waveform equalization is based on the theory that a given transmission characteristic $\phi(\omega)$ can be expanded to a polynominal given by $$\phi(\omega) = \sum_{k=-\infty}^{\infty} C_k \cdot e^{-j\omega k\tau} \quad (1)$$

Further, form another point of view or when considered in regard to the time axis, a waveform $H(t)$ can be obtained by integrating an echo of a given input waveform $X(t)$ as follows:

$$H(t) = \sum_{k=-\infty}^{\infty} C_k \cdot X(t - k\tau) \quad (2)$$

In the two equations above described, $C_k$ is a coefficient used for adjusting the polarity and amplitude of the outputs of the individual taps of the delay circuit by the adjusting circuits, and caleed a tap coefficient in this specification. These tap coefficients $C_k$ are suitably adjusted by transmitting a test waveform such as a sine squared pulse waveform which facilitates distortion detection and manually controlling the individual adjusting circuits while observing the output waveform of the equalizer so that the overall distortion of the transmitted waveform can be reduced to a minimum. Such manner of adjustment is easily feasible in industrial television equipments such as those installed in broadcasting stations. However, it is almost impossible for the users of home television receivers to make such adjustment.

A method for automatically attaining such waveform equalization has been proposed hitherto. This proposed method comprises transmitting and receiving a predetermined test waveform prior to the transmission of a desired signal and detecting distortion of the test waveform for automatically equalizing the waveform. Such a method is described, for example, in a paper of R. W. Lucky and H. R. Rudin entitled "An Automatic Equalizer for General-Purpose Communication Channels" B.S.T.J., Vol. 46, November, 1967, pp. 2179–2208. However, the disclosed automatic waveform equalization is only applicable to a communication system in which a transmitting station and a receiving station have a specific predetermined relationship therebetween, due to the fact that there is the necessity for transmission and reception of a special test waveform. Another applicable case is such that the waveform of a transmitted signal is always constant like the waveform used in a digital signal communication system. Therefore, the disclosed automatic waveform equalization is not applicable to a system such as a television broadcasting system in which the waveform of the transmitted signal varies incessantly and the signal is received by many receivers of various kinds.

SUMMARY OF THE INVENTION

It is an object of the present invention to provide a novel and improved waveform equalizing system which can automatically compensates for waveform distortion of a received signal occurring in a signal transmission path or in the interior of a receiver.

Another object of the present invention is to provide a waveform equalizing system which is suitable for use in a television receiver for automatically compensating for waveform distortion of a received television signal.

Still another object of the present invention is to provide a television receiver which can automatically internally compensate for whatever kind of linear waveform distortion occurring during the transmission and reception of a televised picture.

Yet another object of the present invention is to provide a television receiver which can automatically internally compensate for whatever kind of linear waveform distortion occurring during the transmission and reception of a televised picture without requiring addition of a signal of special waveform to the transmitted television signal.

The present invention which attains the objects above described is based on the finding that a television signal is transmitted in the form which includes a signal such as a horizontal or vertical synchronizing signal having a constant waveform, or a suitable signal having a constant waveform is superposed on the television signal in the broadcasting station for the purposes of testing the characteristic of television equipments and monitoring the television equipments. The present invention is featured by generating a reference signal having the same waveform as that of the signal transmitted with the constant waveform above specified, comparing this reference signal with the received signal corresponding to the reference signal for detecting waveform distortion of the received signal, and utilizing this result of detection for controlling the tap coefficients of a transversal filter thereby automatically compensating for waveform distortion.

DESCRIPTION OF THE PREFERRED EMBODIMENTS

Figure 1:
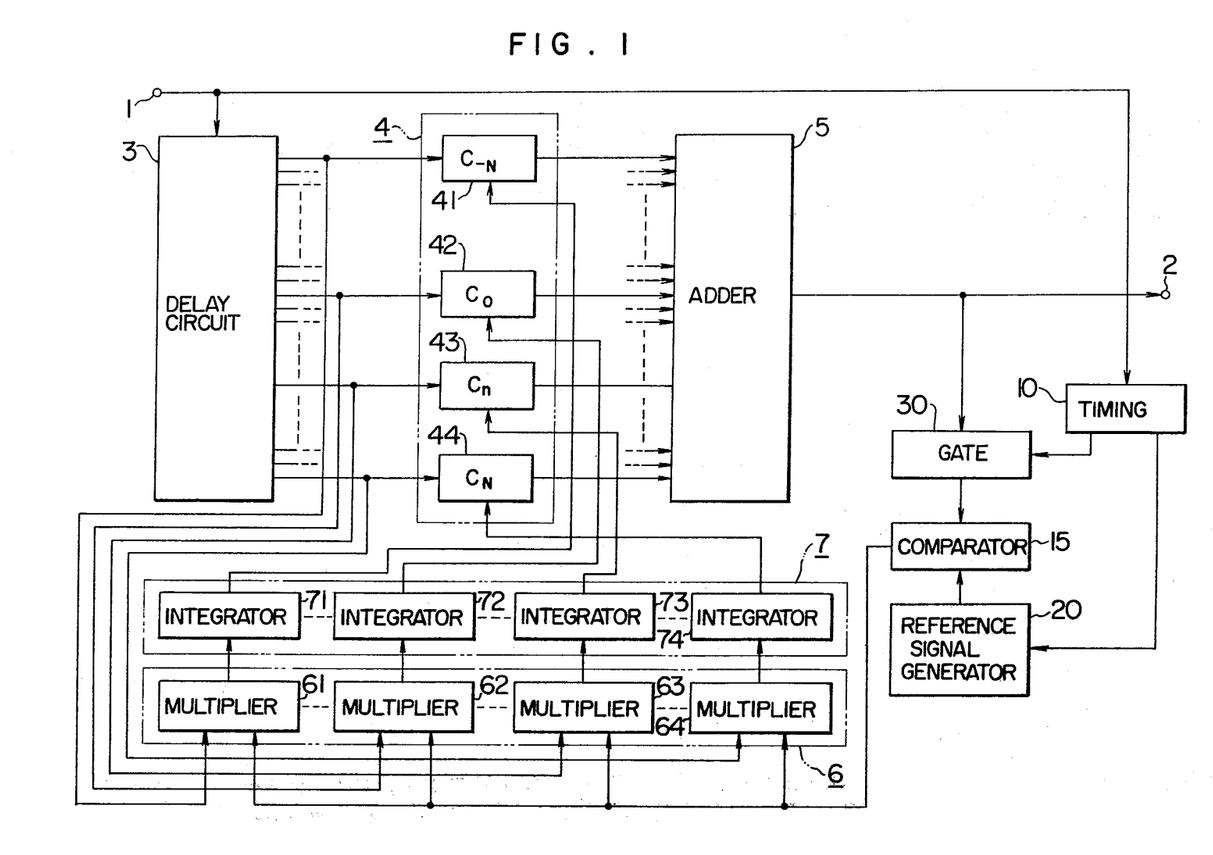
FIG. 1 is a block diagram of an embodiment of the automatic waveform equalizing system according to the present invention.

Referring to FIG. 1 showing in block diagram the structure of a preferred embodiment of the automatic waveform equalizing system according to the present invention, a video signal is applied to an input terminal 1 after detection and appears at an output terminal 2 in the form in which waveform distortion thereof is compensated. The circuit shown in FIG. 1 may be inserted in any suitable stage between the video detection stage and the cathode-ray tube of a television receiver.

A delay circuit 3 is provided with a plurality of taps each giving a delay line of $\tau$ seconds. This delay circuit 3 may be obtained by connecting in series a plurality of delay elements each giving a delay time of $\tau$ seconds or providing a plurality of intermediate taps on a single delay line. The time interval $\tau$ between the delay times given by the adjacent taps is preferably of the order of 0.1 $\mu$sec in view of the frequency band of a video signal in a composite television signal. A plurality of tap coefficient adjusting circuits 4 are connected to the respective taps of the delay circuit 3 so that the polarity and amplitude of the output signal appearing from each of the individual taps of the delay circuit 3 can be controlled by a control signal. The reference numerals 41 to 44 represent four of these tap coefficient adjusting circuits 4, and is apparent that the tap coefficient adjusting circuits 4 are provided in the number equal to that of the taps of the delay circuit 3. For example, when the number of the taps is (2N + 1), there are provided (2N + 1) tap coefficient adjusting circuits 41 to 44. The output signals controlled in their polarity and amp amplitude by the tap coefficient adjusting circuits 4 are applied to an adder 5 to be added together, and the resultant signal appears at the output terminal 2. The circuit structure above described may be used as a manual waveform equalizing circuit when the control signal applied to each of the tap coefficient adjusting circuits 41 to 44 is manually adjusted. It is apparent that, with the increase in the number of the taps and in the number of the tap coefficient adjusting circuits 4 the number of which is equal to that of the taps, the equalized waveform approaches more to the exact waveform. However, this number is preferably of the order of 20 in practical use.

The automatic waveform equalizing system according to the present invention is featured by the provision of means for generating the control signal applied to the tap coefficient adjusting circuit 4. This means will now be described in detail.

Although the waveform of a television signal varies incessantly, it includes a signal having a constant period and constant waveform. This signal is the synchronizing signal, and horizontal synchronizing pulses, vertical synchronizing pulses and equalizing pulses each having a constant waveform are transmitted with the video signal. Therefore, waveform distortion of such signal can be easily detected when the detection is carried out with the period of transmission of this specific signal. Further, in the broadcasting station, a vertical interval test signal (hereinafter abbreviated as VITS) is superposed on the television signal for the purposes of testing the characteristic of and monitoring the operation of television equipments. The position of insertion of this VITS in the vertical blanking period and the waveform of this VITS vary depending on the broadcasting stations. However, the inserted position and waveform of the VITS are scheduled to be unified in future, and the waveform thereof consists of sime squared pulses and sine squared bars. Thus, when the inserted position and waveform of this VITS are unified, this VITS can also be utilized for the detection of waveform distortion as effectively as the synchronizing signal.

A timing circuit 10 extracts the synchronizing signal from the video signal supplied from the input terminal 1 to generate a trigger pulse and a gate pulse. These trigger pulse and gate pulse are generated with the transmission timing of the waveform utilized for the detection of waveform distortion. For instance, these trigger pulse and gate pulse are generated in synchronism with the horizontal synchronizing signal when the horizontal synchronizing pulse is utilized for the detection of waveform distortion. When the vertical synchronizing pulse, equalizing pulse or VITS is utilized for the detection of waveform distortion, the trigger pulse and gate pulse are generated in synchronism with the transmission timing of the respective signals. The means for generating these trigger pulse and gate pulse may be a flip-flop circuit for which the horizontal synchronizing signal and vertical synchronizing signal separated from the television signal input by a conventional synchronizing signal separator may be used as a trigger pulse or a clear pulse.

The trigger pulse generated by the timing circuit 10 is applied to a reference signal generator 20. In response to the application of the trigger pulse, this reference signal generator 20 generates a reference signal having the same waveform as the ideal transmitted waveform of the signal which is utilized for the detection of waveform distortion. When, for example, the horizontal synchronizing pulse is utilized for the detection of waveform distortion, the reference signal generator 20 generates a pulse signal having the same waveform as the original waveform of the horizontal synchronizing signal transmitted from the broadcasting station. Basically, the synchronizing signal generator used in the transmitter or the vertical interval test signal generator can be employed as this reference signal generator 20.

The gate pulse generated by the timing circuit 10 is applied to a gate circuit 30 which extracts the waveform used for the waveform distortion detection from the video signal appearing at the output of the adder 5. This signal, for example, the horizontal synchronizing signal extracted by the gate circuit 30 involves waveform distortion before it is subject to waveform equalization due to the fact that it is transmitted through the television signal transmission path. The output signal of the gate circuit 30 involving such waveform distortion and the signal of the ideal waveform generated by the reference signal generator 20 are applied simultaneously to a comparator 15. This comparator 15 is in the form of an analog subtractor, and thus, an error signal representing the difference between these two input signals appears from the comparator 15. This error signal output of the comparator 15 is applied to one input terminal of all of analog multipliers 61 to 64 provided in the number equal to the number of the taps of the delay circuit 3. The output signals appearing from the taps of the delay circuit 3 are applied to the other input terminal of the respective analog multipliers 61 to 64 to be multiplied respectively by the error signal applied from the comparator 15. The outputs of the multipliers 61 to 64 are respectively applied through associated integrators 71 to 74 to the tap coefficient adjusting circuits 41 to 44 as a control signal. Thus, the outputs of the individual tap coefficient adjusting circuits 41 to 44 are controlled depending on the error signal delivered from the comparator 15, and automatic control is carried out to reduce the error to zero. As a result, the output signal appearing from the adder 5 has the same waveform as that of the reference signal generated by the reference signal generator 20, and the waveform distortion can be compensated.

The position of the gate circuit 30 in the embodiment shown in FIG. 1 is in no way limited to that illustrated. The output signal of the adder 5 may be directly applied to the comparator 15, and the gate circuit 30 may be connected to the output of the comparator 15. Further, the gate circuit 30 may be disposed on the output side of each multiplier 6 or on the input side of each multiplier 6 to which the output signal of the associated tap of the delay circuit 3 is applied. Furthermore, the multipliers 6 may be arranged to operate only when the gate pulse is applied to the gate circuit 30.

Figure 2A:
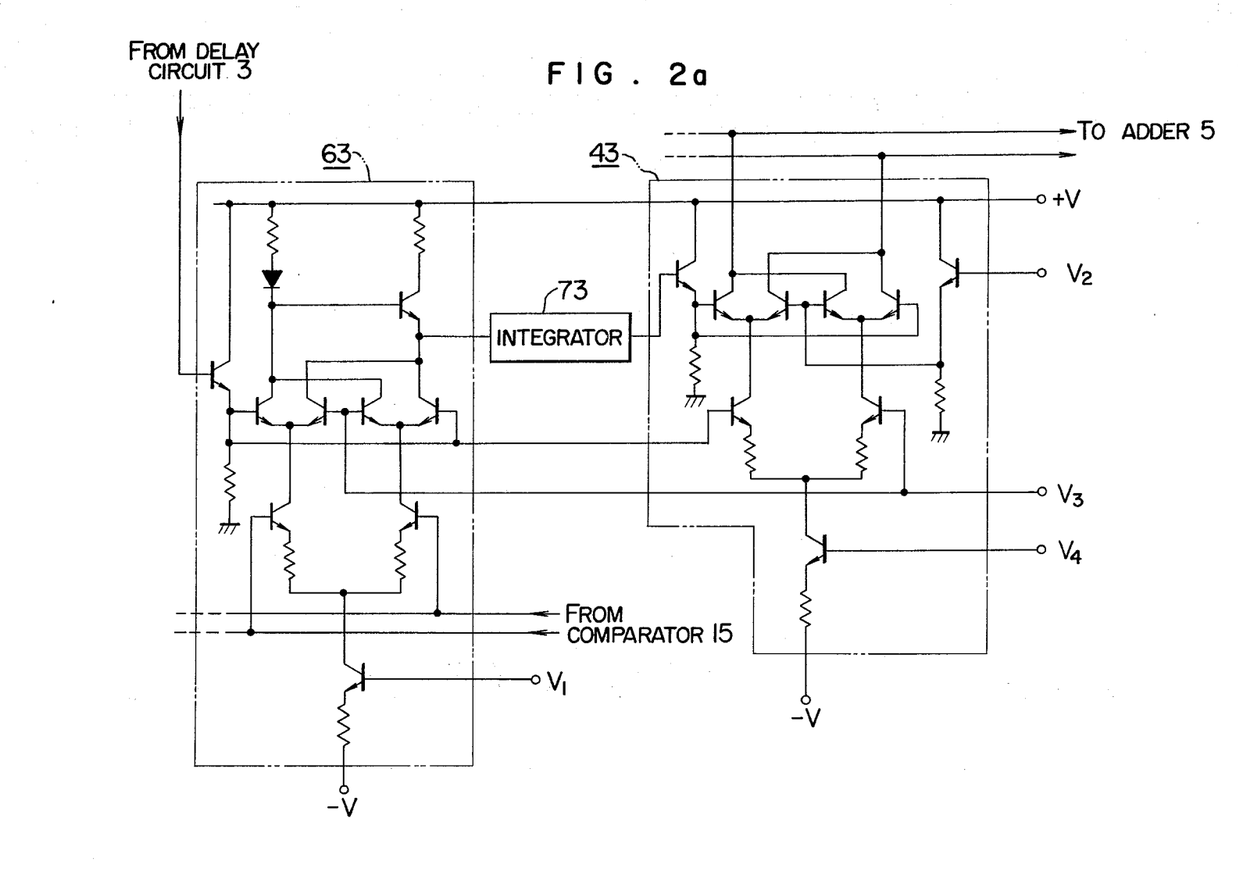
FIGS. 2a and 2b are circuit diagrams showing the practical structure of principal parts of the embodiment shown in FIG. 1.

FIGS. 2a and 2b show one practical form of parts of the embodiment shown in FIG. 1. FIG. 2a shows one practical structure of the tap coefficient adjusting circuit 43 among those shown in FIG. 1 and the multiplier 63 among those shown in FIG. 1. In the form shown in FIG. 2a, the tap coefficient adjusting circuit 43 and multiplier 63 are each formed of an integrated circuit. The input applied from the comparator 15 and the output applied to the adder 5 are in a balanced relationship. A positive power supply voltage and a negative power supply voltage are applied to terminals +V and −V respectively, and bias voltages are applied to terminals V1 to V4.

Figure 2B:
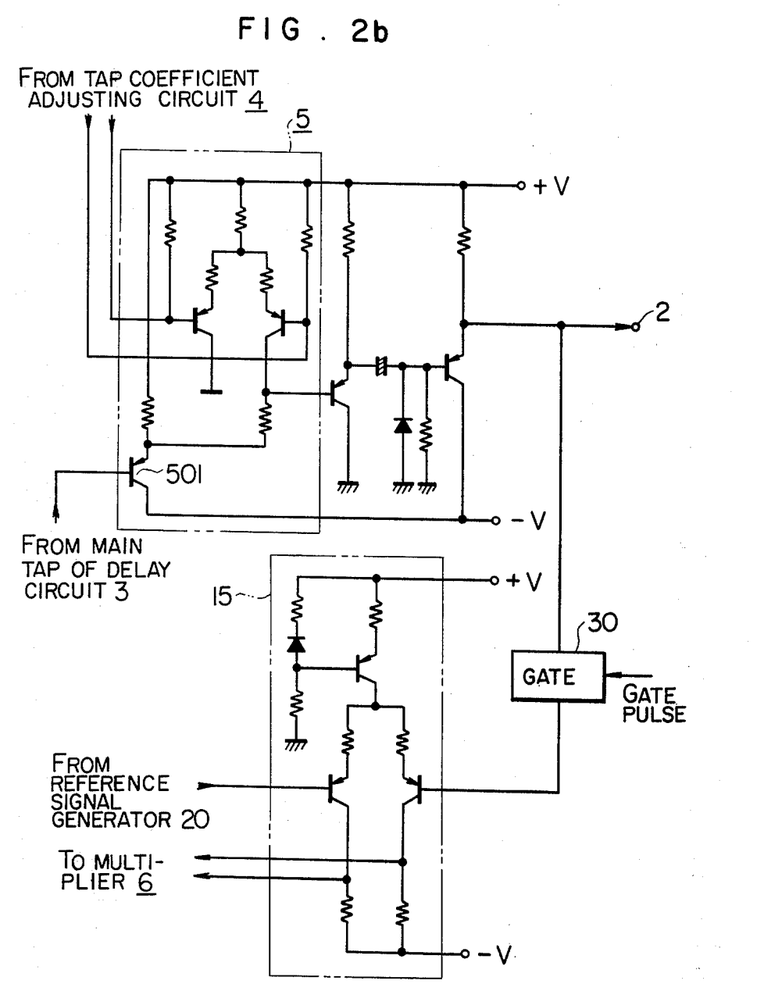

FIG. 2b shows one practical structure of the adder 5 and comparator 15 shown in FIG. 1. In FIG. 2b, the output signal appearing from one of the taps of the delay circuit 3 is applied to a transistor 501 in the adder 5 to be added to the output signals of the tap coefficient adjusting circuits 4. In this manner, the signal applied to the transistor 501 is taken as a reference so that the amplitude of the individual signals which lad or lag behind the phase of this specific signal can be adjusted for the purpose of waveform equalization. The output signal of the center tap of the delay circuit 3 is generally selected as this specific signal. However, the output signal of the tap giving less delay time may be selected when the waveform distortion to be compensated results chiefly from a source giving rise to ghost. The delay time of the signal subjected to waveform equalization and appearing at the output terminal 2 relative to that of the signal applied to the input terminal 1 varies depending on the position of the tap of the delay circuit 3 from which this specific signal is obtained. Therefore, in order that the appearing timing of the reference signal waveform can coincide with that of the corresponding waveform of the output signal of the adder 5, the trigger pulse generated by the timing circuit 10 must be delayed by a period of time equal to the delay time of the specific signal obtained from the specific tap of the delay circuit 3. This can be easily attained by adjusting the circuit constant of the flip-flop circuit constituting the timing circuit 10.

The gate pulse may also be delayed similarly. However, for the purpose of detection of waveform distortion, the signal portions preceding and following the waveform subjected to waveform distortion detection are also required, and the gate pulse must have a pulse width greater than the detected waveform. Therefore, the delaying of the gate pulse is not necessarily required.

The basic principle of automatic waveform equalization according to the present invention will now be described. The signal waveforms appearing at various parts of FIG. 1 and the factors used in FIG. 1 are defined as follows:

Distorted television signal waveform applied to input terminal 1: $X(t)$

Television signal output waveform appearing at output terminal 2: $H(t)$

Output waveform (error waveform) appearing from comparator 15: $E(t)$

Output waveform (reference waveform) appearing from reference signal generator 20: $R(t)$ Tap coefficient of each tap coefficient adjusting circuit 4: $C_n$ Tap interval in delay circuit 3: $\tau$ seconds Overall magnitude of error in waveform: E The following relations hold among the values above defined:

$$H(t) = \sum_{n=-N}^{N} C_n \cdot X(t - n\tau) \tag{3}$$

$$E = \int_{-\infty}^{\infty} \{E(t)\}^2 dt = \int_{-\infty}^{\infty} \{H(t) - R(t)\}^2 dt \tag{4}$$

$$= \int_{-\infty}^{\infty} \left( \sum_{n=-N}^{N} C_n \cdot X(t - n\tau) - R(t) \right)^2 dt$$

Figure 3:
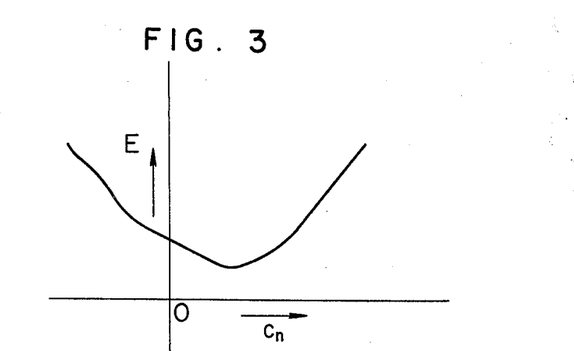
FIG. 3 is a graph showing the relation between the tap coefficient of the transversal filter in FIG. 1 and the error in the waveform.

The waveform is equalized when the tap coefficients $C_n$ of all the tap coefficient adjusting circuits 4 are controlled to reduce the overall error E of the waveform to a minimum. It is known that the equation (4) is a convex function of the tap coefficient $C_n$ as, for example, shown in FIG. 3. In FIG. 3, E is a minimum at a point given by $\delta E/\delta C_n = 0$. Thus, the error E can be reduced to a minimum by such a manner of automatic control that the tap coefficients $C_n$ are decreased and increased respectively when the detected value of $\delta E/\delta C_n$ is positive and negative. This $\delta E/\delta C_n$ is given by $$\frac{\delta E}{\delta C_n} = 2 \int_{-\infty}^{\infty} \{H(t) - R(t)\} \cdot \{X(t - n\tau)\} dt \quad (5)$$

In the equation (5), the first member $\{H(t) - R(t)\}$ represents $E(t)$, that is, the output waveform appearing from the comparator 15, and the second member $\{X(t - n\tau)\}$ represents the output waveform appearing from the nth tap which is considered now. Therefore, the value of $\delta E/\delta C_n$ can be obtained when the output waveform appearing from the comparator 15 and the output waveform appearing from the nth tap corresponding to the tap coefficient $C_n$ to be controlled now are applied to the corresponding multiplier to obtain their product, and then the output waveform appearing from the specific multiplier is integrated with respect to time by the corresponding integrator. The corresponding tap coefficient adjusting circuit is then controlled by the output signal of this integrator.

Such manner of operation is carried out simultaneously for all the remaining taps. This manner of automatic control is repeated many times on the waveform extracted successively by the gate circuit 30 so as to reduce the error E to a minimum.

The operation of the system according to the present invention will be described with reference to a waveform diagram shown in FIG. 4 when the horizontal synchronizing signal is utilized for the detection of waveform distortion.

Figure 4:
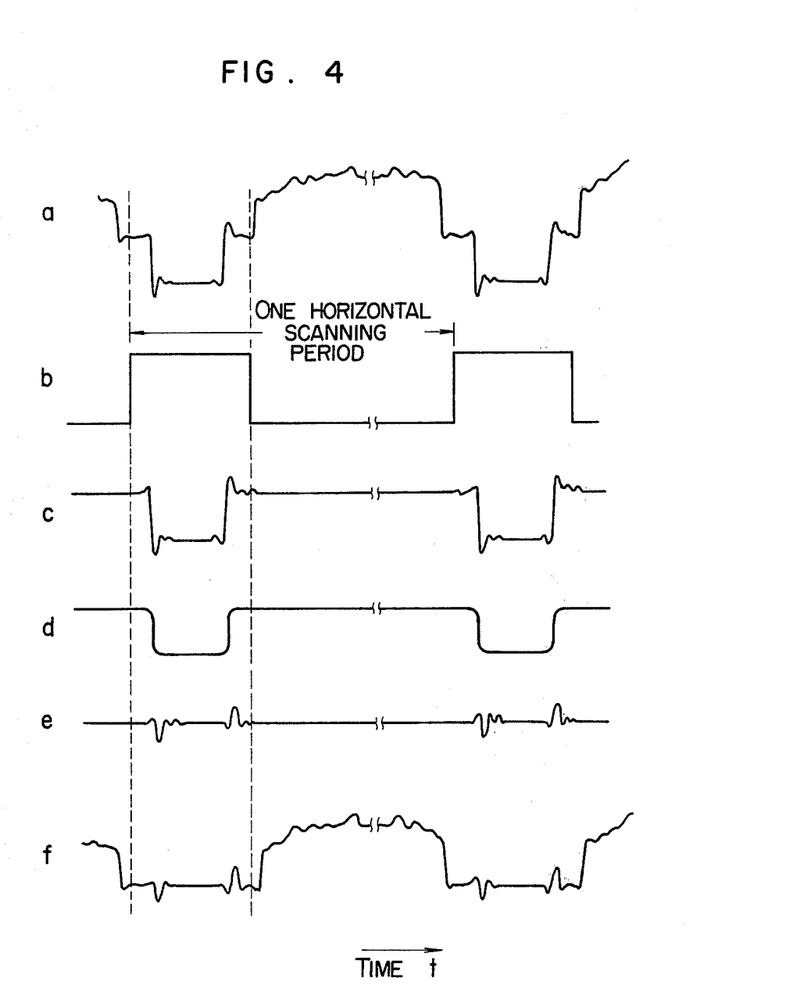
FIG. 4 shows signal waveforms for illustrating the operation of the embodiment shown in FIG. 1.

The television signal waveform varies incessantly depending on the video information as seen in FIG. 4a, and therefore, the television signal waveform cannot be compared with the reference signal waveform in the portion of the horizontal scanning period in which the video information is included. For the purpose of waveform comparison, the timing circuit 10 generates the gate pulse with the timing shown in FIG. 4b so that the horizontal synchronizing signal portion having the constant waveform irrespective of the video information can solely be extracted by the gate circuit 30. As a result, the waveform shown in FIG. 4c is obtained. This waveform is compared by the comparator 15 with the reference signal waveform shown in FIG. 4d generated by the reference signal generator 20 to obtain an error signal waveform as shown in FIG. 4e. This error signal is applied to the multipliers 61 to 64 for the purpose of waveform equalization.

When the gate circuit 30 is not disposed in the position illustrated in FIG. 1, the gate pulse may be applied to the bias terminal VI of the multiplier 63 shown in FIG. 2a. In such a case, the gate circuit 30 shown in FIG. 2b is eliminated, and the output signal of the adder 5 is applied to one input terminal of the comparator 15. In this case, the output waveform appearing from the comparator 15 is as shown in FIG. 4f. However, the operation of the entire system is the same as that above described due to the fact that the multipliers 6 operate only during the period of time in which the gate pulse shown in FIG. 4b appears.

Since the horizontal synchronizing signal and the video signal are transmitted by way of the same transmission path, both these signals are adversely affected to the same extent when a factor giving rise to waveform distortion exists midway of the transmission path. Therefore, when the waveform of the horizontal synchronizing signal is equalized, the waveform of the video signal is also automatically equalized. In a strict sense, the pulse width of the horizontal synchronizing pulse in the equalizing pulse period and vertical synchronizing pulse period differs from that in the other period. Thus, in order to ensure exact waveform equalization, the gate pulse and trigger pulse are desirably not generated in the equalizing pulse period and vertical synchronizing pulse period. To this end, the vertical blanking pulse may be extracted from the television receiver provided with the waveform equalizing system of the present invention, and such pulse may be applied to the timing circuit 10 to present appearance of the gate pulse and trigger pulse during the periods above specified.

As described previously, the signal utilized for the detection of waveform distortion is not limited to the horizontal synchronizing signal, and any other suitable signal having a constant waveform can be utilized for this purpose even when it is transmitted periodically. The operation of the system of the present invention when utilizing such a signal will be described with reference to FIGS. 5 and 6.

Figure 5:
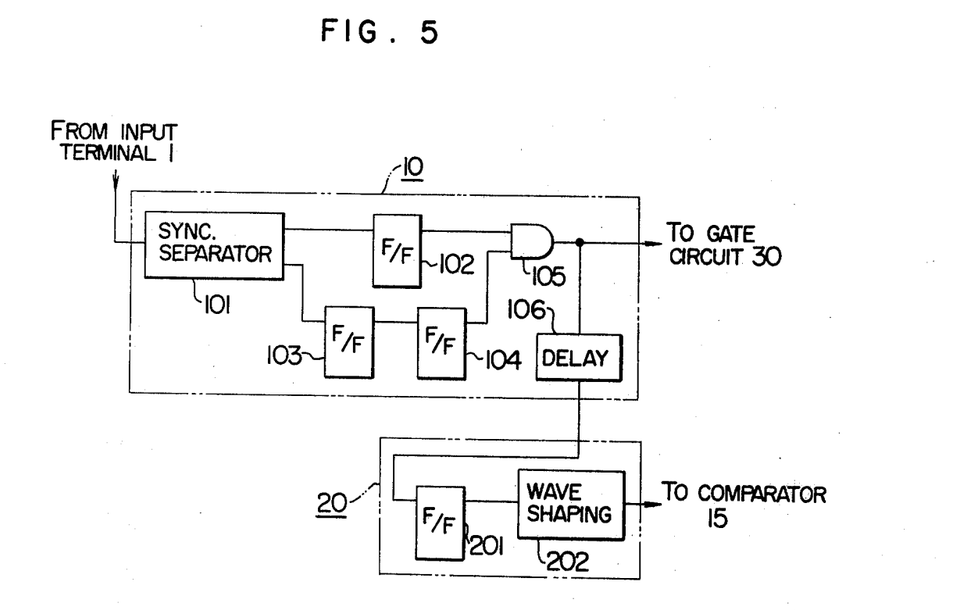
FIG. 5 is a block diagram showing the detailed structure of one form of the timing circuit and reference signal generator in FIG. 1.
Figure 6:
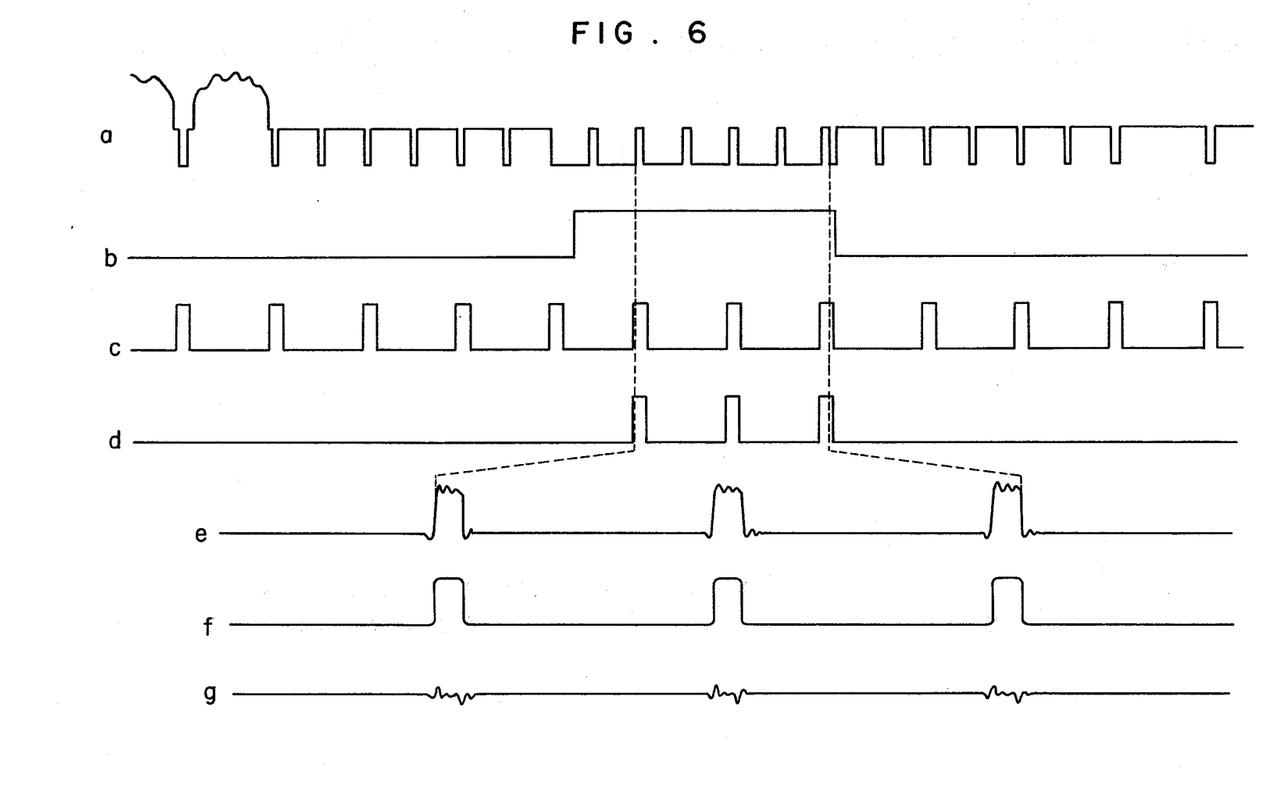
FIG. 6 shows signal waveforms for illustrating the operation of the system of the present invention employing the timing circuit and reference signal generator, shown in FIG. 5.

FIG. 5 is a block diagram showing another form of the timing circuit 10 and reference signal generator 20 when the vertical synchronizing pulse is utilized for the detection of waveform distortion. FIGS. 6a to 6g show signal waveforms for illustrating the operation of the system of the present invention employing the circuit shown in FIG. 5.

Referring to FIG. 5, the horizontal synchronizing signal and vertical synchronizing signal are separated by a synchronizing signal separator 101 from the television signal applied to the input terminal 1. This synchronizing signal separator 101 may be unnecessary when the horizontal flyback pulse and vertical blanking pulse are extracted from the television receiver provided with the waveform equalizing system according to the present invention, and such pulses are utilized for the detection of waveform distortion. The horizontal synchronizing signal or flyback pulse thus separated is applied to a flip-flop circuit 102 constituting a monostable multivibrator so that the pulse width thereof can be controlled to a suitable value. In this case, the serrating portion of the vertical synchronizing pulses appearing at a rate of one-half of the horizontal scanning period is utilized for the detection of waveform distortion, and as a result, a pulse having a width as shown in FIG. 6c is obtained in which it will be seen that the pulse width includes this serrating portion of the waveform and the portions preceding and following this waveform portion. The vertical synchronizing signal separated by the synchronizing signal separator 101 or the vertical blanking pulse is applied to another flip-flop circuit 103, and the output of this flip-flop circuit 103 is applied to another flip-flop circuit 104. A pulse signal as shown in FIG. 6b is obtained by the flip-flop circuits 103 and 104 constituting two monostable multivibrators, and this pulse signal covers the vertical synchronizing signal portion shown in FIG. 6a. The outputs of the flip-flop circuits 102 and 104 are applied to an AND gate 105 to obtain a gate pulse signal as shown in FIG. 6d. This gate pulse signal is used to gate the output signal of the adder 5 to obtain a waveform as shown in FIG. 6e in which the time axis is expanded.

The output signal of the AND gate 105 is applied to a delay circuit 106 to be delayed thereby for obtaining a trigger pulse whose appearing timing coincides with the timing of the pulse waveform extracted by the gate circuit 30. This trigger pulse is then applied to a flip-flop circuit 201 in the reference signal generator 20. This flip-flop circuit 201 acts as a monostable multivibrator which generates a pulse having a pulse width equal to that of the serrating portion of the vertical synchronizing pulses. The output signal of the flip-flop circuit 201 is applied to a wave shaping circuit 202 to obtain a reference signal as shown in FIG. 6f. The gated signal shown in FIG. 6e and the reference signal shown in FIG. 6f are applied to the comparator 15 to obtained an error signal as shown in FIG. 6g. This error signal is used for the automatic waveform equalization in the same manner as that described previously.

When it is desired to utilize the equalizing pulse for the detection of waveform distortion, the time constant of the flip-flop circuits 103 and 104 may be suitably adjusted or changed so that the pulse shown in FIG. 6b can appear at the position of the equalizing pulse portion shown in FIG. 6a. In such a case, the time constant of the flip-flop circuit 201 in the reference signal generator 20 is also changed to attain coincidence between the pulse width of the reference signal waveform and that of the equalizing pulse.

Figure 7:
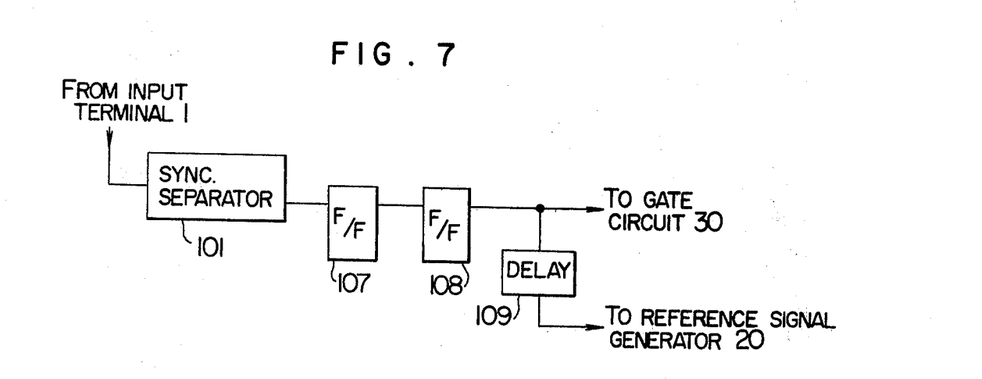
FIG. 7 is a block diagram of another form of the timing circuit.

FIG. 7 is a block diagram showing another practical structure of the timing circuit 10 when the VITS is utilized for the detection of waveform distortion, and FIGS. 8a to 8e show signal waveforms for illustrating the operation of the system of the present invention using such timing circuit 10.

Figure 8:
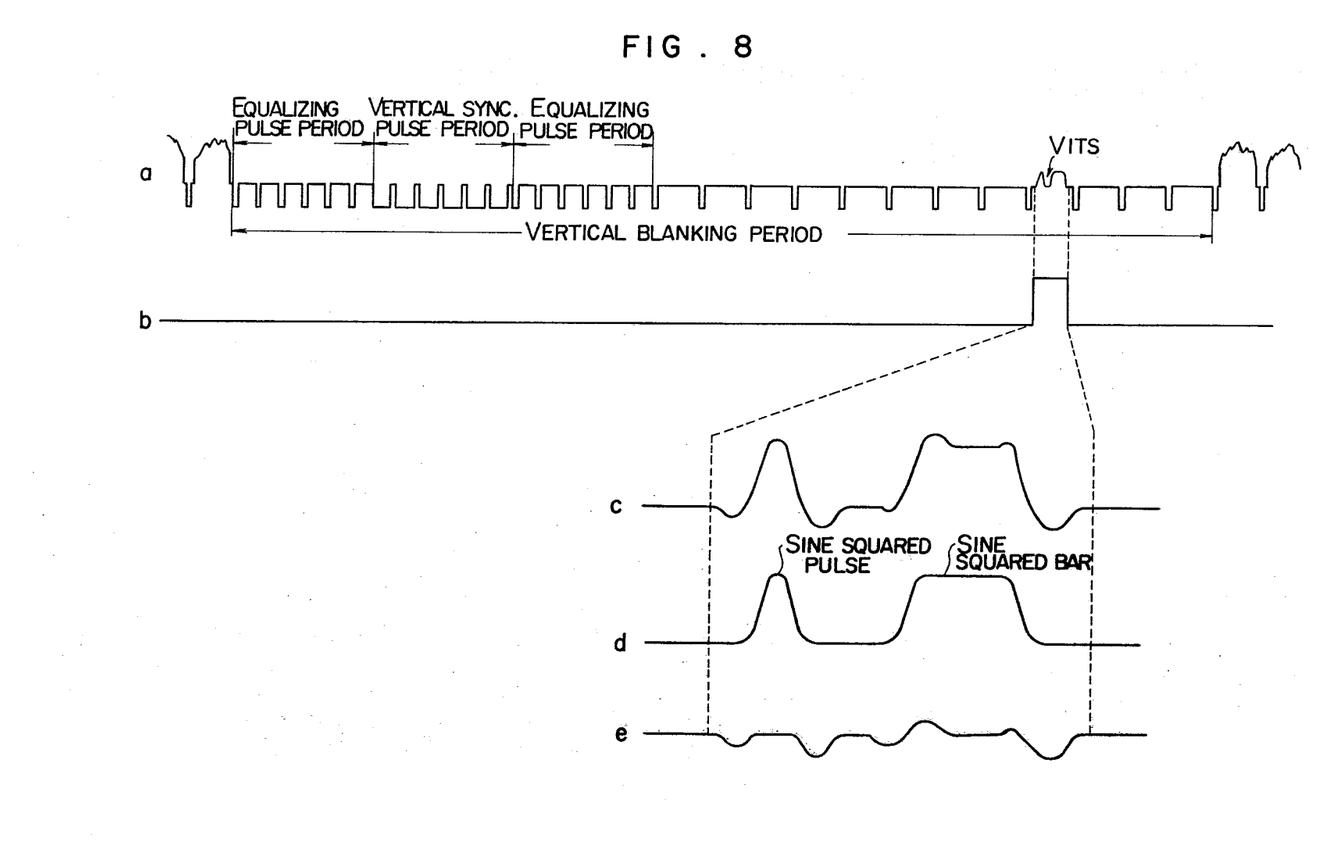
FIG. 8 shows signal waveforms for illustrating the operation of the system of the present invention employing the timing circuit shown in FIG. 7.

The VITS is inserted in a predetermined position of the vertical blanking period as shown in FIG. 8a. Therefore, this signal can be extracted on the basis of the vertical synchronizing signal. As in the circuit shown in FIG. 5, the vertical synchronizing signal separated by a synchronizing signal separator 101 is used to trigger a flip-flop circuit 107, and a second trigger signal is generated from the flip-flop circuit 107 at a position immediately before the inserted position of the VITS. This second trigger signal output of the flip-flop circuit 107 is applied to another flip-flop circuit 108 to obtain a gate pulse as shown in FIG. 8b in which it will be seen that the gate pulse has a pulse width enough to extract the VITS. This gate pulse is applied to the gate circuit 30 for extracting the waveform of the VITS from the output signal of the adder 5 as shown in FIG. 8c. In the form shown in FIG. 8c, the VITS is a composite signal consisting of a sine squared pulse and a sine squared bar. This gate pulse is then suitably delayed to provide a trigger pulse as required so that the reference signal generator 20 can generate a signal (FIG. 8d) having the same waveform as that of the VITS inserted in the television signal in the broadcasting station. Then, the signals shown in FIGS. 8c and 8d are applied to the comparator 15 to obtain an error signal as shown in FIG. 8e, and this error signal is used for the automatic waveform equalization in the same manner as that described hereinbefore.

We claim:

1. An automatic waveform equalizing system for use in a television receiver for automatically compensating for linear waveform distortion occurring in a standard television signal received by the television receiver comprising a transversal filter including delay means having a plurality of taps for delivering output signals with successively increased delay times having a predetermined time interval therebetween, a plurality of control means for controlling the polarity and amplitude of the individual output signals delivered from said taps of said delay means, and adding means for adding the individual output signals controlled by said control means; means for applying the standard television signal to said transversal filter; means for extracting solely a predetermined signal portion from the television signal output of said transversal filter; reference signal generating means for generating a reference signal having the same waveform as the original transmitted waveform of said predetermined signal portion; comparing means for comparing said signal extracted by said extracting means with said reference signal generated by said reference signal generating means with the same timing thereby obtaining an error signal representing the difference therebetween; a plurality of control signal generating means including means for multiplying the individual output signals delivered from said taps of said delay means by said error signal obtained by said comparing means, and integrating means for integrating the resultant individual signals respectively; and means for controlling said control means by applying the individual control signals generated by said control signal generating means on the basis of the individual output signals of said taps of said delay means to said control means controlling the output signals of the respective taps of said delay means; wherein said extracting means comprises means for extracting at least one serrated portion of the vertical synchronizing pulses in said television signal, and said reference signal generating means comprises means for generating a pulse signal having the same waveform as that of the original transmitted waveform corresponding to said serrated portion extracted by said extracting means.

2. An automatic waveform equalizing system for use in a television receiver for automatically compensating for linear waveform distortion occurring in a standard television signal received by the television receiver comprising a transversal filter including delay means having a plurality of taps for delivering output signals with successively increased delay times having a predetermined time interval therebetween, a plurality of control means for controlling the polarity and amplitude of the individual output signals delivered from said taps of said delay means, and adding means for adding the individual output signals controlled by said control means, means for applying the standard television signal to said transversal filter; means for extracting solely a predetermined signal portion from the television signal output of said transversal filter; reference signal generating means for generating a reference signal having the same waveform as the original transmitted waveform of said predetermined signal portion; comparing means for comparing said signal extracted by said extracting means with said reference signal generated by said reference signal generating means with the same timing thereby obtaining an error signal representing the difference therebetween; a plurality of control signal generating means including means for multiplying the individual output signals delivered from said taps of said delay means by said error signal obtained by said comparing means, and integrating means for integrating the resultant individual signals respectively; and means for controlling said control means by applying the individual control signals generated by said control signal generating means on the basis of the individual output signals of said taps of said delay means to said control means controlling the output signals of the respective taps of said delay means; wherein said extracting means comprises means for extracting at least one of the equalizing pulses appearing in the vertical blanking period of said television signal, and said reference signal generating means comprises means for generating a pulse signal having the same waveform as that of the original transmitted equalizing pulse corresponding to said equalizing pulse extracted by said extracting means.

3. An automatic waveform equalizing system for use in a television receiver for automatically compensating for linear waveform distortion occurring in a standard television signal received by the television receiver comprising a transversal filter including delay means having a plurality of taps for delivering output signals with successively increased delay times having a predetermined time interval therebetween, a plurality of control means for controlling the polarity and amplitude of the individual output signals controlled by said control means; means for applying the standard television signal to said transversal filter; means for extracting solely a predetermind signal portion from the television signal output of said transversal filter; reference signal generating means for generating a reference signal having the same waveform as the original transmitted waveform of said predetermined signal portion; comparing means for comparing said signal extracted by said extracting means with said reference signal generated by said reference signal generating means with the same timing thereby obtaining an error signal representing the difference therebetween; a plurality of control signal generating means including means for multiplying the individual output signals delivered from said taps of said delay means by said error signal obtained by said comparing means, and integrating means for integrating the resultant signals respectively; and means for controlling said control means by applying the individual control signals generated by said control signal generating means on the basis of the individual output signals of said taps of said delay means to said control means controlling the output signals of the respective taps of said delay means; wherein said extracting means comprises means for extracting the horizontal synchronizing pulse in said television signal, and said reference signal generating means comprises means for generating a pulse signal having the same waveform as that of the original transmitted waveform of said horizontal synchronizig pulse in said television signal.

4. An automatic waveform equalizing system for use in a television receiver for automatically compensating for linear waveform distortion occurring in a standard television signal received by the television receiver comprising a transversal filter including delay means having a plurality of taps for delivering output signals with successively increased delay times having a predetermined time interval therebetween, a plurality of control means for controlling the polarity and amplitude of the individual output signals delivered from said taps of said delay means, and adding means for adding the individual output signals controlled by said control means; means for applying the standard television signal to said transversal filter; means for extracting solely a predetermined signal portion from the television signal output of said transversal filter; reference signal generating means for generating a reference signal having the same waveform as the original transmitted waveform of said predetermined signal portion; comparing means for comparing said signal extracted by said extracting means with said reference signal generated by said reference signal generating means with the same timing thereby obtaining an error signal representing the difference therebetween; a plurality of control signal generating means including means for multiplying the individual output signals delivered from said taps of said delay means by said error signal obtained by said comparing means, and integrating means for integrating the resultant individual signals respectively; and means for controlling said control means for applying the individual control signals generated by said control signal generating means on the basis of the individual output signals of said taps of said delay means to said control means controlling the output signals of the respective taps of said delay means; wherein said extracting means comprises means for extracting a test signal having a predetermined waveform and located only in a predetermined position of the vertical blanking period of said television signal, and said reference signal generating means comprises means for generating a signal having the same waveform as that of the original transmitted waveform of said test signal.

* * * * *